(12) United States Patent
Lyons et al.

(10) Patent No.: US 8,687,640 B2
(45) Date of Patent: Apr. 1, 2014

(54) CONTROLLING COMMUNICATION SESSIONS

(75) Inventors: Michael Anthony Lyons, Enfield (GB); David Stephen Hammond, Enfield (GB); Nicholas Peter Larkin, Enfield (GB); Oliver James Carter, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 239 days.

(21) Appl. No.: 13/069,324

(22) Filed: Mar. 22, 2011

(65) Prior Publication Data

US 2012/0243549 A1 Sep. 27, 2012

(51) Int. Cl.
*H04L 12/28* (2006.01)

(52) U.S. Cl.
USPC ............... 370/395.2; 370/401

(58) Field of Classification Search
USPC ............... 370/410, 395.2, 400, 401
See application file for complete search history.

(56) References Cited

U.S. PATENT DOCUMENTS

2004/0202295 A1* 10/2004 Shen et al. ............... 379/112.01
2011/0032930 A1* 2/2011 Belling ..................... 370/352
2012/0270554 A1* 10/2012 Hellwig et al. ............ 455/445

\* cited by examiner

*Primary Examiner* — Hong Cho
(74) *Attorney, Agent, or Firm* — EIP US LLP

(57) ABSTRACT

There is provided a method of enabling media bypass for a media gateway in a telecommunications network which includes a plurality of media gateways via which a signaling path for transfer of signaling information for setup of a communication session between endpoint devices can be established and via which a media path for transfer of media data between the endpoint devices during the communication session can be established. The method includes receiving, at the media gateway, an inbound communication session setup request message requesting setup of a communication session between an originating endpoint device and a terminating endpoint device in the telecommunications network, the inbound communication session setup request message being transmitted along an inbound signaling path to the media gateway; transmitting, from the media gateway, an outbound communication session setup request message in response to receiving the inbound communication session setup message, the outbound communication session setup request message being transmitted along an outbound signaling path from the media gateway; and including preceding device connectivity data in the outbound communication session setup request message, the preceding device connectivity data indicating at least one media connectivity setting for at least one preceding device which is located before the media gateway in the inbound signaling path, the at least one connectivity setting identifying one or more other devices to which the at least one preceding device is configured to be connectable in the media path, to enable bypass of the media gateway in the media path if an ensuing device in the outbound signaling path determines that such bypass should be conducted.

31 Claims, 9 Drawing Sheets

FIG. 6A

| Stack ID | Address info | Connectivity |
|---|---|---|
| 0 | aPhone 1 | A, B, C |

FIG. 6B

| Stack ID | Address info | Connectivity |
|---|---|---|
| 1 | aSBC 1 | X |
| 0 | aPhone 1 | A, B, C |

FIG. 6C

| Stack ID | Address info | Connectivity |
|---|---|---|
| 2 | aSBC 2 | F, G, H |
| 1 | aSBC 1 | X |
| 0 | aPhone 1 | A, B, C |

FIG. 6D

| Stack ID | Address info | Connectivity |
|---|---|---|
| 0 | aPhone 1 | A, B, C |

CONTROLLING COMMUNICATION SESSIONS

FIELD OF THE INVENTION

The present invention relates to control of communication sessions in a telecommunications network. In particular, but not exclusively, the present invention relates to controlling establishment of a media path for communication sessions using one or more media gateways in a packet-based telecommunications network.

BACKGROUND OF THE INVENTION

Packet-based telecommunications networks typically include media gateway devices. For example, a Session Border Controller (SBC) is deployed at the border of a Voice Over Internet Protocol (VoIP) network and protects the network by policing communication sessions such as voice calls (or 'VoIP calls') flowing into or out of that network. The SBC may have to relay media data for a communication session, for example either because the media data transits the protected network and needs policing, or because the originating and terminating endpoint devices for the communication session cannot send media data to each other directly as they are located in different private networks.

Communication sessions such as voice calls are commonly set up using the Session Initiation Protocol (SIP). A SIP session involves an offer stage requesting setup of a communication session and an answer stage responding to the setup request. The offer stage involves one or more communication session setup request messages in the form of SIP signaling messages being transmitted from an originating endpoint device to a terminating endpoint device. The communication session setup request messages frequently traverse a number of media gateways en-route, each of which may redirect or forward the communication session setup request messages. The answer stage involves one or more communication session setup response messages being transmitted in the opposite direction from the terminating endpoint device to the originating endpoint device in order to accept or reject the communication offer.

Communication session setup request signaling messages typically carry a single description of the media parameters for the communication session, including an offered address where media data from the request receiving device should be transmitted.

This presents a problem for a media gateway processing a communication session setup request because the media gateway does not know, before the completion of the communication session setup process whether it would be best to relay media data for the communication session via the media gateway or not.

A media gateway will typically choose to relay the media for the communication session, since that is the 'safe' option. The disadvantage of selecting the 'safe' option is that it forces the media data to be relayed through every media gateway in the communication session setup path, which wastes valuable network resources and degrades the media quality by increasing latency.

It would therefore be desirable to provide improved methods for controlling establishment of media paths for communication sessions in a telecommunications network.

SUMMARY OF THE INVENTION

In accordance with a first aspect of the present invention, there is provided a method of enabling media bypass for a media gateway in a telecommunications network which includes a plurality of media gateways via which a signaling path for transfer of signaling information for setup of a communication session between endpoint devices can be established and via which a media path for transfer of media data between the endpoint devices during the communication session can be established, the method comprising:

receiving, at the media gateway, an inbound communication session setup request message requesting setup of a communication session between an originating endpoint device and a terminating endpoint device in the telecommunications network, the inbound communication session setup request message being transmitted along an inbound signaling path to the media gateway;

transmitting, from the media gateway, an outbound communication session setup request message in response to receiving the inbound communication session setup message, the outbound communication session setup request message being transmitted along an outbound signaling path from the media gateway; and including preceding device connectivity data in the outbound communication session setup request message, the preceding device connectivity data indicating at least one media connectivity setting for at least one preceding device which is located before the media gateway in the inbound signaling path, the at least one connectivity setting identifying one or more other devices to which the at least one preceding device is configured to be connectable in the media path, to enable bypass of the media gateway in the media path if an ensuing device in the outbound signaling path determines that such bypass should be conducted.

Hence, the present invention allows for identification of a device which need not be included in the media path for a communication session which takes into account connectivity of other devices which may be included in the media path.

In an embodiment of the invention, the preceding device connectivity data indicates at least one media connectivity setting for each of a plurality of preceding devices which are located before the media gateway in the inbound signaling path, the at least one connectivity setting for each respective preceding device identifying one or more other devices to which the respective preceding device is configured to be connectable in the media path, to enable bypass of the media gateway and at least one other preceding device in the media path if an ensuing device in the outbound signaling path determines that such bypass should be conducted. Hence, the invention provides for the option to bypass multiple devices in the media path for a communication session.

In an embodiment of the invention, the inbound communication session setup request message comprises at least some of the connectivity data. Hence, signaling messaging already being used to set up a communication session can be employed to convey data required for identifying media bypass opportunities.

An embodiment of the invention involves retrieving ensuing device connectivity data for an ensuing device which is located after the media gateway in the outbound signaling path, the ensuing device connectivity data indicating at least one media connectivity setting for the ensuing device, the at least one connectivity setting identifying one or more other devices to which the ensuing device is configured to be connectable in the media path, and comparing the preceding device connectivity data and the ensuing device connectivity data, and determining, from the comparison, whether the media gateway may be bypassed in the media path. Hence, media connectivity settings in common between devices located in the signaling path may be used to identify opportunities for media bypass.

In an embodiment of the invention, the ensuing device connectivity data is retrieved from storage in the media gateway. Hence, media gateways which keep a record of connectivity of other devices located in the telecommunications network can utilize such data in this embodiment.

Embodiments of the invention involve including in the outbound communication session setup request message an address associated with the media gateway as an offered address for transmittal of media data during the session, whereby the media path for the communication session can include the media gateway if it is not determined by an ensuing device that the media gateway should be bypassed in the media path. Hence, a media gateway can offer an option that it be included in the media path for a communication session.

Embodiments of the invention involve including in the outbound communication session setup request message an address associated with a different preceding device as an offered address for transmittal of media data during the session, whereby the media path for the communication session can bypass the media gateway, the different preceding device being located between the media gateway and the at least one preceding device in the inbound signaling path. Hence, a media gateway can determine that it may not be included in the media path for a communication session.

Embodiments of the invention comprise retrieving bypass mode data for the media gateway, the bypass mode data indicating a bypass mode setting for the media gateway, and configuring the outbound communication session setup request message in dependence on the indicated bypass mode setting. Hence, any settings which might affect the media bypass functionality of the invention can be taken into account by the media gateway or an ensuing device.

One embodiment of the invention comprises determining from the bypass mode data that the media gateway may be bypassed in the media path, and including the preceding device connectivity data in the outbound communication session setup request message in response to the determination. Hence, a setting that allows a media gateway to be bypassed can be identified and processed accordingly.

Another embodiment of the invention comprises determining from the bypass mode data that the media gateway must be bypassed in the media path, including the preceding device connectivity data in the outbound communication session setup request message in response to the determination, and including in the outbound communication session setup request message an address associated with a preceding device as an offered address for transmittal of media data during the session, whereby the media path for the communication session can bypass the media gateway. Hence, a setting that indicates a media gateway must be bypassed can be identified and processed accordingly.

In some embodiments of the invention, in addition to the preceding device connectivity data, preceding device address data is included in the outbound communication session setup request message, the preceding device address data identifying a network address for transmittal of media data during the session. Hence, an ensuing device can be informed of where to transmit media data if implementing the media bypass functionality of the invention.

In other embodiments of the invention, the outbound communication session setup request message is configured according to a standard, wherein the standard includes a first standard field, which is specified in the standard, the contents of which are specified as including an address as an offered address for transmittal of media data during the session, and a second standard field, which is specified in the standard, the contents of which are specified for including extension data which are not specifically identified in the standard, wherein the preceding device connectivity data is inserted into the second standard field in the outbound communication session setup request message. Hence, the invention uses existing data fields in signaling messaging to convey data required for media bypass functionality.

Embodiments of the invention comprise inserting a bypass notification parameter into the outbound communication session setup request message, the bypass notification parameter being included in the second standard field and being capable of notifying an enabled ensuing device located in the outbound signaling path, which enabled ensuing device is capable of processing preceding device connectivity data in the second standard field, that the preceding device connectivity data was not altered by another, non-enabled, ensuing device in the outbound signaling path, if such non-enabled ensuing device is located between the enabled ensuing device and the media gateway. Hence, standard behaviour of a media gateway which is not able to process the media bypass functionality of the invention can be identified and acted upon accordingly by an ensuing media gateway.

Embodiments of the invention comprise receiving, at the media gateway, a first communication session setup response message indicating that the terminating endpoint device has agreed to conduct the communication session with the originating endpoint device, and transmitting a second communication session setup response message to a device located in the inbound signaling path, the second communication session setup response message comprising a bypass confirmation parameter confirming to devices located in the inbound signaling path that the media gateway has been bypassed in the media path established for the communication session. Hence, a media gateway can identify whether it has been removed from the media path or not and allocate/de-allocate media resources accordingly.

The at least one media connectivity settings may comprise one or more of a domain identifier, a network identifier, and a gateway identifier. Hence, a number of different settings can be used to identify potential media bypass opportunities.

In various embodiments of the invention, the preceding device may comprise the originating endpoint device, the preceding device may comprise a media gateway and the ensuing device may comprise a media gateway. Hence, the media bypass functionality of the invention can be applied to communication sessions having signaling paths involving various media gateway arrangements.

In embodiments of the invention, the inbound and outbound communication session setup request messages comprise Session Initiation Protocol, SIP, messages, the preceding device connectivity data is included in a Session Description Protocol, SDP, field, and the preceding device connectivity data is included in a Session Description Protocol, SDP, extension field. Hence, the present invention supports use of existing SIP and SDP frameworks.

In an embodiment of the invention, a given media gateway comprises a plurality of input and output communication trunks via which communication sessions can be conducted, each trunk being capable of having different associated media connectivity settings.

In accordance with a second aspect of the present invention, there is provided a computer program product comprising a non-transitory computer-readable storage medium having computer readable instructions stored thereon, the computer readable instructions being executable by a computerized device to cause the computerized device to perform a method for enabling media bypass for a media gateway in a telecommunications network which includes a plurality of media gateways via which a signaling path for transfer of signaling information for setup of a communication session between endpoint devices can be established and via which a media path for transfer of media data between the endpoint devices during the communication session can be established, the method comprising:

receiving, at the media gateway, an inbound communication session setup request message requesting setup of a communication session between an originating endpoint device and a terminating endpoint device in the telecommunications network, the inbound communication session setup request message being transmitted along an inbound signaling path to the media gateway;

transmitting, from the media gateway, an outbound communication session setup request message in response to receiving the inbound communication session setup message, the outbound communication session setup request message being transmitted along an outbound signaling path from the media gateway; and including preceding device connectivity data in the outbound communication session setup request message, the preceding device connectivity data indicating at least one media connectivity setting for at least one preceding device which is located before the media gateway in the inbound signaling path, the at least one connectivity setting identifying one or more other devices to which the at least one preceding device is configured to be connectable in the media path, to enable bypass of the media gateway in the media path if an ensuing device in the outbound signaling path determines that such bypass should be conducted.

In accordance with a third aspect of the present invention, there is provided a media gateway adapted to enable media bypass in a telecommunications network which includes a plurality of media gateways via which a signaling path for transfer of signaling information for setup of a communication session between endpoint devices can be established and via which a media path for transfer of media data between the endpoint devices during the communication session can be established, the media gateway being adapted to:

receive an inbound communication session setup request message requesting setup of a communication session between an originating endpoint device and a terminating endpoint device in the telecommunications network, the inbound communication session setup request message being received along an inbound signaling path to the media gateway;

transmit an outbound communication session setup request message in response to receiving the inbound communication session setup message, the outbound communication session setup request message being transmitted along an outbound signaling path from the media gateway; and include preceding device connectivity data in the outbound communication session setup request message, the preceding device connectivity data indicating at least one media connectivity setting for at least one preceding device which is located before the media gateway in the inbound signaling path, the at least one connectivity setting identifying one or more other devices to which the at least one preceding device is configured to be connectable in the media path, to enable bypass of the media gateway in the media path if an ensuing device in the outbound signaling path determines that such bypass should be conducted.

In accordance with a fourth aspect of the present invention, there is provided a method of enabling media bypass for a bypass-determining media gateway in a telecommunications network which includes a plurality of media gateways via which a signaling path for transfer of signaling information for setup of a communication session between endpoint devices can be established and via which a media path for transfer of media data between the endpoint devices during the communication session can be established, the method comprising:

receiving, at the bypass-determining media gateway, an inbound communication session setup request message requesting setup of a communication session between an originating endpoint device and a terminating endpoint device in the telecommunications network, the inbound communication session setup request message being transmitted along an inbound signaling path to the bypass-determining media gateway;

transmitting, from the bypass-determining media gateway, an outbound communication session setup request message in response to receiving the inbound communication session setup request message, the outbound communication session setup request message being transmitted along an outbound signaling path from the bypass-determining media gateway;

receiving preceding device connectivity data in the inbound communication session setup request message, the preceding device connectivity data indicating at least one media connectivity setting for at least one preceding device which is located before the bypass-determining media gateway in the inbound signaling path, the at least one connectivity setting identifying one or more other devices to which the at least one preceding device is configured to be connectable in the media path, to enable bypass of a preceding media gateway in the media path; and determining that the preceding media gateway should be bypassed based on the preceding device connectivity data, and configuring the outbound communication session setup request message in accordance with the determination.

In accordance with a fifth aspect of the present invention, there is provided a computer program product comprising a non-transitory computer-readable storage medium having computer readable instructions stored thereon, the computer readable instructions being executable by a computerized device to cause the computerized device to perform a method for enabling media bypass for a bypass-determining media gateway in a telecommunications network which includes a plurality of media gateways via which a signaling path for transfer of signaling information for setup of a communication session between endpoint devices can be established and via which a media path for transfer of media data between the endpoint devices during the communication session can be established, the method comprising:

receiving, at the bypass-determining media gateway, an inbound communication session setup request message requesting setup of a communication session between an originating endpoint device and a terminating endpoint device in the telecommunications network, the inbound communication session setup request message being transmitted along an inbound signaling path to the bypass-determining media gateway;

transmitting, from the bypass-determining media gateway, an outbound communication session setup request message in response to receiving the inbound communication session setup request message, the outbound communication session setup request message being transmitted along an outbound signaling path from the bypass-determining media gateway;

receiving preceding device connectivity data in the inbound communication session setup request message, the preceding device connectivity data indicating at least one media connectivity setting for at least one preceding device which is located before the bypass-determining media gateway in the inbound signaling path, the at least one connectivity setting identifying one or more other devices to which the at least one preceding device is configured to be connectable in the media path, to enable bypass of a preceding media gateway in the media path; and determining that the preceding media gateway should be bypassed based on the preceding device connectivity data, and configuring the outbound communication session setup request message in accordance with the determination.

In accordance with a sixth aspect of the present invention, there is provided a bypass-determining media gateway adapted to enable media bypass in a telecommunications network which includes a plurality of media gateways via which a signaling path for transfer of signaling information for setup of a communication session between endpoint devices can be established and via which a media path for transfer of media data between the endpoint devices during the communication session can be established, the bypass-determining media gateway being adapted to:

receive an inbound communication session setup request message requesting setup of a communication session between an originating endpoint device and a terminating endpoint device in the telecommunications network, the inbound communication session setup request message being transmitted along an inbound signaling path to the bypass-determining media gateway;

transmit an outbound communication session setup request message in response to receiving the inbound communication session setup request message, the outbound communication session setup request message being transmitted along an outbound signaling path from the bypass-determining media gateway;

receive preceding device connectivity data in the inbound communication session setup request message, the preceding device connectivity data indicating at least one media connectivity setting for at least one preceding device which is located before the bypass-determining media gateway in the inbound signaling path, the at least one connectivity setting identifying one or more other devices to which the at least one preceding device is configured to be connectable in the media path, to enable bypass of a preceding media gateway in the media path; and determine that the preceding media gateway should be bypassed based on the preceding device connectivity data, and configure the outbound communication session setup request message in accordance with the determination.

Further features and advantages of the invention will become apparent from the following description of preferred embodiments of the invention, given by way of example only, which is made with reference to the accompanying drawings.

BRIEF DESCRIPTION OF THE DRAWINGS

FIG. 6 depicts several media bypass data stacks according to embodiments of the present invention.

DETAILED DESCRIPTION

Figure 1:
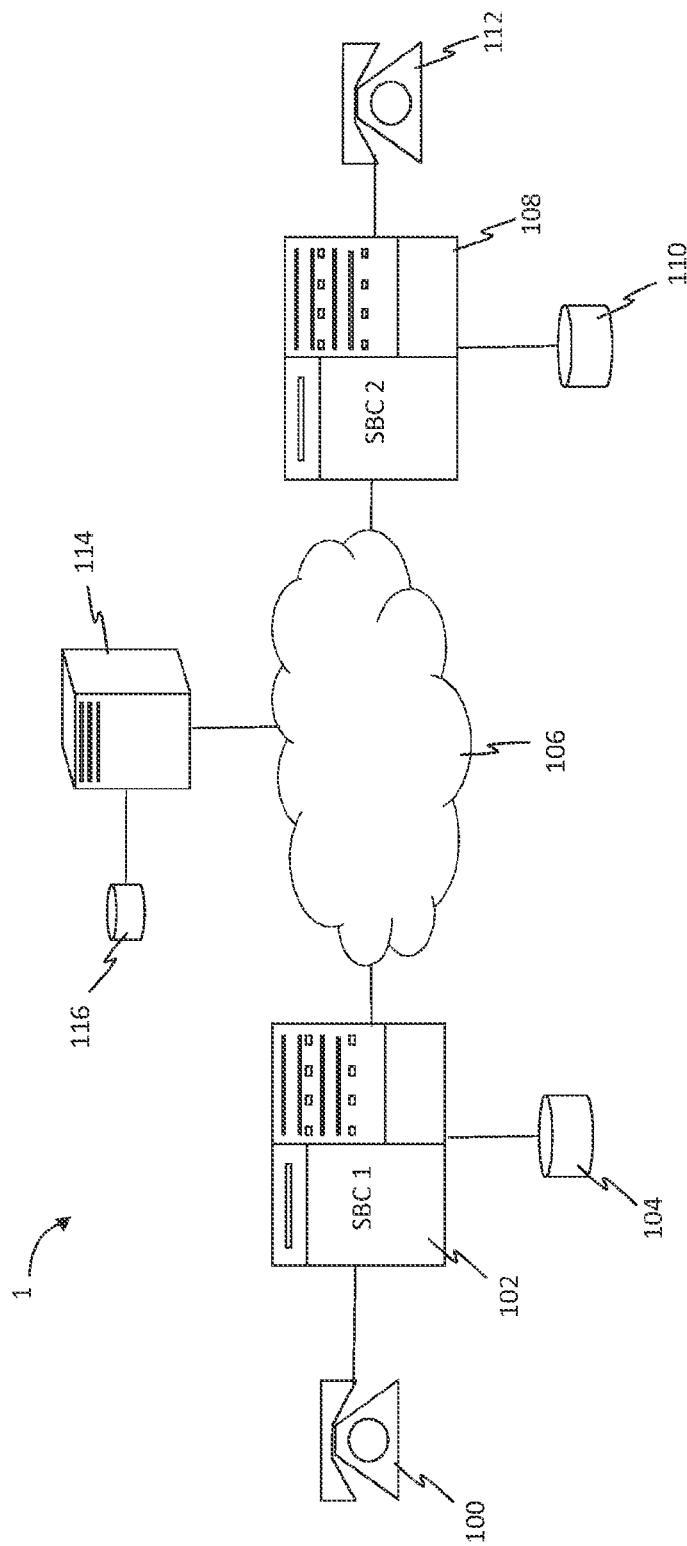
FIG. 1 is a system diagram according to embodiments of the present invention.

The invention will now be described with reference to the drawing figures, in which like reference numerals refer to like parts throughout.

FIG. 1 is a system diagram according to embodiments of the present invention. FIG. 1 illustrates an exemplary telecommunications network 1 that includes a plurality of endpoint devices 100, 112 and a plurality of media gateways 102, 108. Telecommunications network 1 may contain more endpoint and media gateways (not shown).

Endpoint device 100 is connected to media gateway 102 (denoted as 'SBC 1') which is in turn connected to network 106. Network 106 may comprise one or more packet-switched networks such as the Internet and/or circuit-switched networks such as a Public Switched Telephone Network (PSTN). Endpoint device 112 is connected to media gateway 108 (denoted as 'SBC 2') which is in turn connected to network 106. Media gateways 102 and 108 have access to databases 104 and 110 respectively. SIP Registrar 114 is a server connected to network 106 which provides a location service allowing registration of IP addresses against SIP Uniform Resource Identifiers (URIs) for SIP devices and processing of SIP device location queries. SIP Registrar 114 keeps a record of registered devices in registration database 116.

Endpoint devices 100, 112 and media gateways 102, 108 are capable of conducting communications sessions where signaling procedures are used to setup and control the sessions and media processing procedures are used to transfer media data during the sessions. Each endpoint device 100, 112 could for example include a VoIP telephone, or a computing device such as a personal computer configured to conduct communications sessions. Each media gateway 102, 108 could for example take the form of an SBC, a computer server that includes hardware and/or software implementing a SIP proxy server, a Softswitch, and other forms of media gateway. An originating and terminating endpoint device pair 100, 112 may carry out a communication session such as a voice call via one or more media gateways 102, 108.

A media gateway will typically (but not always) be located on the boundary between two different domains or parts of telecommunications network 1, for example on the boundary between a private LAN and the Internet, with the media gateway being responsible for policing communication sessions in and out of the private LAN.

Figure 2:
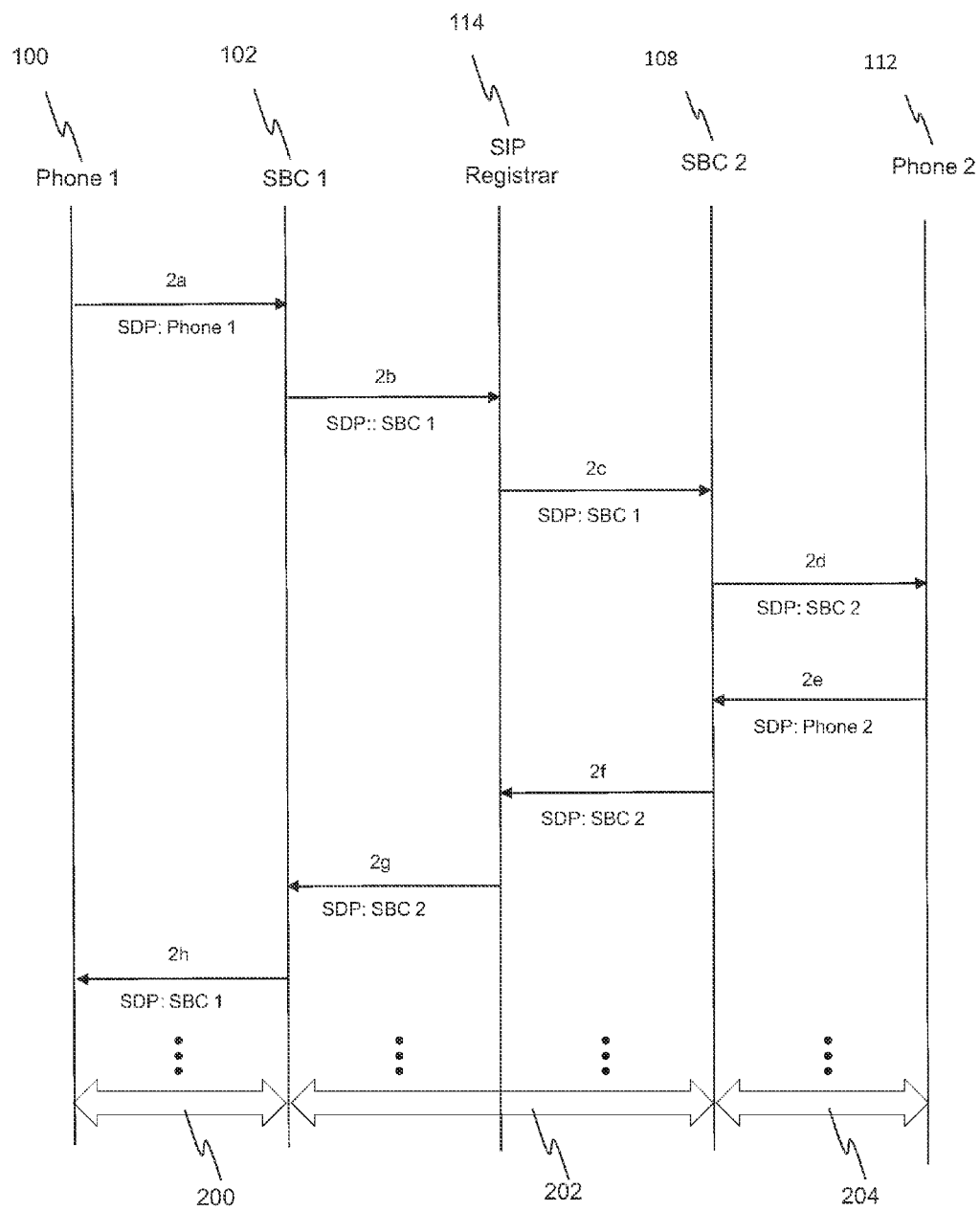
FIG. 2 is a message flow diagram depicting control of a communication session according to the prior art.

FIG. 2 is a message flow diagram depicting control of a communication session according to the prior art. The embodiments of FIG. 2 can be implemented in a system as depicted in FIG. 1.

The user of originating endpoint device 100 (denoted herein as 'Phone 1') wishes to conduct a communication session with the user of terminating endpoint device 112 (denoted herein as 'Phone 2'). Initiation of the communication session begins with appropriate user input on Phone 1, for example selection of the user of Phone 2 from an address book stored on Phone 1. Phone 1 is configured to contact media gateway SBC 1 with all communication session requests, i.e. SBC1 acts as the SIP back-to-back user agent for Phone 1. Phone 1 therefore transmits a communication session setup request message in the form of a SIP Invite signaling message to SBC 1 in step 2a, for example addressed to phone2@largeent.net. The Invite message of step 2a contains Session Description Protocol (SDP) data for Phone 1, i.e. an address associated with Phone 1 is given as an address for transmittal of media data during the communication session.

SBC 1 forwards the Invite message according to its routing rules to SIP registrar 114 in step 2b. SBC 1 alters the SDP for the Invite message of step 2b to refer to an address associated with SBC 1, i.e. an address associated with SBC 1 is given as an address for transmittal of media data during the communication session.

SIP registrar 114 looks up phone2@largeent.net in registration database 116, resulting in the communication session being redirected using an Invite message, for example addressed to sbc-contact2@sbc2.largeent.net, in step 2c to the registered SIP back-to-back user agent for phone2 which in this case is SBC 2. SIP registrar 114 does not change the SDP data in the Invite message of step 2c.

SBC 2 identifies that setup of a communication session with Phone 2 is being requested, so redirects the communication session to Phone 2 by sending an Invite message to Phone 2, for example addressed to contact2@ipaddress_phone 2, in step 2d. SBC 2 alters the SDP data for the Invite message of step 2d to refer to an address associated with SBC 2, i.e. an address associated with SBC 2 is given as an address for transmittal of media data during the communication session.

Phone 2 responds to the Invite of step 2d offering communication with Phone 1 via SBC 2 with a valid communication session setup response message in the form of a SIP 200 OK signaling message in step 2e. The 200 OK message of step 2e contains SDP data for Phone 2, i.e. an address associated with Phone 2 is given as an address for transmittal of media data during the communication session.

SBC 2 forwards the response message of step 2e on to SIP registrar 114 in the form of a SIP 200 OK message in step 2f. SBC 2 alters the SDP data for the 200 OK message of step 2f to refer to an address associated with SBC 2, i.e. an address associated with SBC 2 is given as an address for transmittal of media data during the communication session.

SIP registrar 114 forwards the response message of step 2f on to SBC 1 in the form of a SIP 200 OK message in step 2g. SIP registrar 114 does not alter the SDP data.

SBC 1 forwards the response message of step 2g on to Phone 1 in the form of a SIP 200 OK message in step 2h. SBC 1 alters the SDP data for the 200 OK message of step 2h to refer to an address associated with SBC 1, i.e. an address associated with SBC 1 is given as an address for transmittal of media data during the communication session.

Media data then flows between Phone 1 and Phone 2 passing via both SBC 1 and SBC 2, i.e. media data flowing from Phone 1 is relayed first via SBC 1 and then via SBC 2 and on to Phone 2. Similarly, media data flowing from Phone 2 is relayed first via SBC 2 and then via SBC 1 and on to Phone 1.

In this example of prior art, the signaling path for the communication session includes Phone 1, SBC 1, SBC 2 and Phone 2. The media path for the communication session also includes Phone 1, SBC 1, SBC 2 and Phone 2.

Transfer of other signaling messages (not shown), such as SIP Acknowledge messages may be transmitted between Phone 1, SBC 1, SIP registrar 114, SBC 2, and Phone 2 before media data begins to flow during the communication session.

In the above prior art case, where a communication session setup request message is directed on by one or more media gateways in the signaling path for the communication session in order to reach a terminating endpoint device, each media gateway will re-write the SDP so that its address is set up in the SDP as an address to which media data for the communication session is to be transmitted. Accordingly, the terminating endpoint device will transmit its media data to the last media gateway in the signaling path, which will send the media data through the chain of media gateways in the signaling path until finally the last media gateway in the signaling path relays the media data to the originating endpoint device.

Embodiments of the invention described below provide improved methods for controlling establishment of the media path for communication sessions in a telecommunications network. The invention provides ways to establish a media path for a communication session which only includes media gateways which are necessary or desired for transferring media data to/from the originating and terminating endpoint devices. If a media gateway is not required or desired in the media path, the invention allows such a device to be bypassed in the media path established for the communication session, i.e. unnecessary links or legs are removed from the media path. The invention therefore avoids unnecessary use of valuable network resources and helps to avoid degradation of the media quality of a communication session caused by increased latency.

The present invention involves including preceding device connectivity data in outbound communication session setup request messages, the preceding device connectivity data indicating at least one media connectivity setting for at least one preceding device which is located before a media gateway in an inbound signaling path, the at least one connectivity setting identifying one or more other devices to which the at least one preceding device is configured to be connectable in the media path, to enable bypass of the media gateway in the media path if an ensuing device in the outbound signaling path determines that such bypass should be conducted.

A preceding device is a device located before a given device (endpoint or media gateway) in the inbound signaling path, i.e. it is located between the given device and the originating endpoint device for the communication session. A preceding device can also comprise the originating endpoint device itself.

An ensuing device is a device located after a given device (endpoint or media gateway) in the outbound signaling path, i.e. it is located between the given device and the terminating endpoint device for the communication session. An ensuing device can also comprise the terminating endpoint device itself.

Embodiments of the invention involve a given media gateway retrieving ensuing device connectivity data for an ensuing device which is located after a media gateway in the outbound signaling path, the ensuing device connectivity data indicating at least one media connectivity setting for the ensuing device, the at least one connectivity setting identifying one or more other devices to which the ensuing device is configured to be connectable in the media path. The preceding device connectivity data and the ensuing device connectivity data can be compared in order to determine whether the given media gateway may be bypassed in the media path.

Ensuing device connectivity data may be retrieved from storage in or accessible by a given media gateway or obtained via a request to an ensuing device that it should provide its device connectivity data including one or more media connectivity settings to the given media gateway.

A device can be configured to insert its media connectivity settings into outbound communication session setup request messaging for a communication session. As the communication session setup request messaging passes through multiple media gateways, preceding device connectivity data in the form of a series of media connectivity settings associated with multiple devices is built up in the communication session setup request messaging. The preceding device connectivity data can then be used by media gateways in the signaling path for a communication session to identify possible shortcuts in the media path for the communication session, and therefore avoid sending the media data through all media gateways involved in the signaling path where possible.

A media gateway has one or more media connectivity settings including one or more parts of telecommunications network 1 via which a respective device is able to transmit and receive media data. A device will typically not have access to all parts of telecommunications network 1 so media connectivity settings for the device describes the parts, domains or regions of telecommunications network 1 to which the device does have media connectivity.

The one media connectivity settings may include different domain identifiers (for example myisp.com or Metaswitch™.com), network identifiers (for example, 'the internet', a Virtual Private Network (VPN) for an office A, a VPN for an office B, a Local Area Network (LAN), a Wide Area Network (WAN)), or gateway identifiers (for example a gateway to one or more physical Time Division Multiplexing (TDM) telephone lines), or any other part of telecommunications network 1 to which a device (endpoint device or media gateway) is able to connect to transmit and receive media data.

The media connectivity settings for a given device will typically be defined by the service provider providing the device. A given media gateway may comprise a plurality of input and output communication trunks via which communication sessions can be conducted. Each trunk may have different associated media connectivity settings which are configurable by the service provider responsible for operating the media gateway or other user.

The preceding device connectivity data may indicate at least one media connectivity setting for each of a plurality of preceding devices which are located before the media gateway in the inbound signaling path, the at least one connectivity setting for each respective preceding device identifying one or more other devices to which the respective preceding device is configured to be connectable in the media path, to enable bypass of the media gateway and at least one other preceding device in the media path if an ensuing device in the outbound signaling path determines that such bypass should be conducted.

A given media gateway can be configured to obtain the media connectivity settings of another media gateway or endpoint device. A given media gateway can be configured to obtain media connectivity settings for other devices located in neighboring or proximate parts of the telecommunications network such that it has this information to hand when a communication session involving one or more of these other devices is initiated. Alternatively, a given media gateway could be configured to obtain media connectivity settings for other devices which are involved in a communication session once setup of the communication session has been initiated.

Some embodiments of the invention involve a given media gateway including in the outbound communication session setup request message an address associated with the given media gateway as an offered address for transmittal of media data during the session. In such embodiments, the media path for the communication session can include the given media gateway if it is not determined by an ensuing device that the given media gateway should be bypassed in the media path.

Other embodiments of the invention involve a given media gateway including in the outbound communication session setup request message an address associated with a different preceding device as an offered address for transmittal of media data during the session. In such embodiments, the media path for the communication session can bypass the given media gateway, the different preceding device being located between the given media gateway and the at least one preceding device in the inbound signaling path.

In embodiments of the invention, bypass mode data is retrieved for a media gateway, the bypass mode data indicating a bypass mode setting for the media gateway. An outbound communication session setup request message transmitted from the media gateway can then be configured in dependence on the indicated bypass mode setting.

It may be determined from the retrieved bypass mode data that the media gateway may be bypassed in the media path, in which case preceding device connectivity data is included in the outbound communication session setup request message.

It may determined from the retrieved bypass mode data that the media gateway must be bypassed in the media path, in which case preceding device connectivity data is included in the outbound communication session setup request message. Furthermore, an address associated with a preceding device is included in the outbound communication session setup request message as an offered address for transmittal of media data during the session such that the media path for the communication session can bypass the media gateway.

It may be determined from the retrieved bypass mode data that the media gateway must not be bypassed in the media path, in which case no preceding device connectivity data is included in the outbound communication session setup request message and an address associated with the media gateway is included in the outbound communication session setup request message as an offered address for transmittal of media data during the session such that the media path for the communication session cannot bypass the media gateway.

In embodiments of the invention, in addition to the preceding device connectivity data, preceding device address data is included in the outbound communication session setup request message, the preceding device address data identifying a network address for transmittal of media data during the session.

Embodiments of the invention involve configuring an outbound communication session setup request message from a media gateway according to a standard. The standard may include a first standard field, which is specified in the standard, the contents of which are specified as including an address as an offered address for transmittal of media data during the session, and a second standard field, which is specified in the standard, the contents of which are specified for including extension data which are not specifically identified in the standard. Preceding device connectivity data is inserted into the second standard field in the outbound communication session setup request message. The first standard field may for example comprise an SDP field and the second standard field may comprise an extension part of an SDP field.

Figure 3:
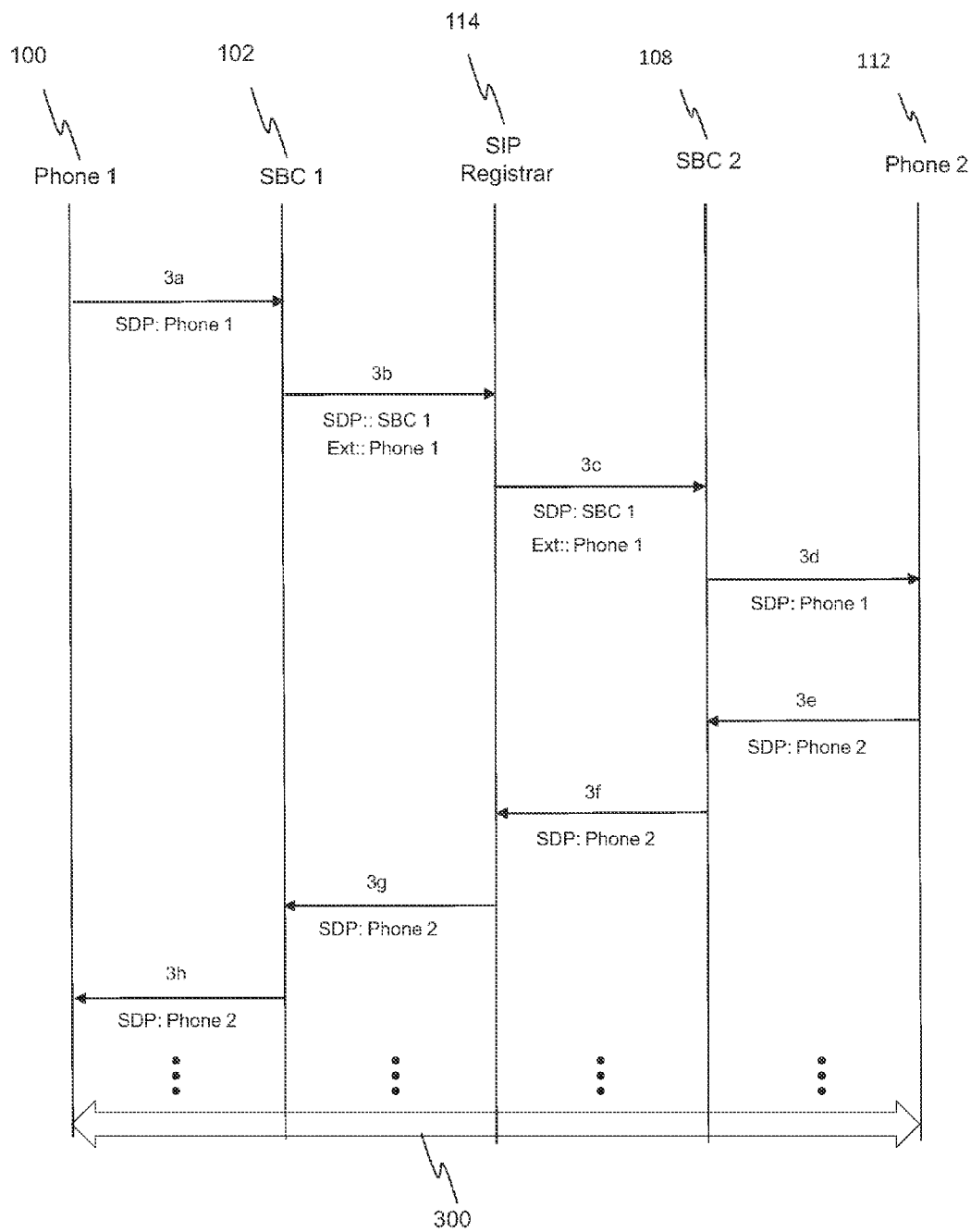
FIG. 3 is a message flow diagram depicting control of a communication session according to embodiments of the present invention.

FIG. 3 is a message flow diagram depicting control of a communication session according to embodiments of the present invention. The embodiments of FIG. 3 can be implemented in a system as depicted in FIG. 1. In these embodiments of the invention, the signaling path for the communication session includes Phone 1, SBC 1, SBC 2 and Phone 2. However, the media path for the communication session only includes Phone 1 and Phone 2, i.e. the media path bypasses both of SBC 1 and SBC 2.

These embodiments involve enabling media bypass for a media gateway in a telecommunications network 1 which includes a plurality of media gateways SBC 1, SBC 2 via which a signaling path for transfer of signaling information for setup of a communication session between endpoint devices 100 ('Phone 1'), 112 ('Phone 2') can be established and via which a media path for transfer of media data between the endpoint devices during the communication session can be established.

When the user of Phone 1 initiates a communication session with Phone 2 by appropriate user input on Phone 1, a communication session setup request message in the form of a SIP Invite signaling message is transmitted to SBC 1 in step 3a. The Invite message of step 3a contains SDP data for Phone 1, i.e. an address associated with Phone 1 is given as an offered address for transmittal of media data during the communication session. The SIP Invite signaling message of step 3a is received at SBC 1 as an inbound communication session setup request message along an inbound signaling path to SBC 1.

SBC 1 acts as a SIP back-to-back user agent for Phone 1, so has knowledge of the media connectivity settings for Phone 1 as well knowledge of its own media connectivity settings. SBC 1 keeps a record of media connectivity settings for Phone 1 and itself, for example by storing media connectivity settings associated with Phone 1 and media connectivity settings associated with SBC 1 in database 104.

SBC 1 transmits an outbound communication session setup request message to SBC 2 in the form of an Invite message, which, according to SBC 1's routing rules passes via SIP registrar 114 in steps 3b and 3c. SBC 1 alters the SDP data for the first communication session setup request message to refer to an address associated with SBC 1, i.e. an address associated with SBC 1 is given as an offered address for transmittal of media data during the communication session. SIP registrar 114 does not alter the SDP data. The SIP Invite signaling message of step 3b is transmitted from SBC 1 as an outbound communication session setup request message along an outbound signaling path from SBC 1.

SBC1 also includes an address associated with Phone 1 in the first communication session setup request message, i.e. an address associated with a different device to SBC 1 is included as an offered address for transmittal of media data during the communication session. The first communication session setup request message therefore comprises an address associated with Phone 1 and also an address associated with SBC 1 as offered addresses for transmittal of media data during the communication session.

The address associated with SBC 1 is inserted into the SDP field of the outbound communication session setup request message. The address associated with Phone 1 is inserted into an extension of the SDP field of the outbound communication session setup request message.

SBC 1 also inserts media connectivity settings associated with Phone 1 and media connectivity settings associated with SBC 1 into the SDP extension field of the outbound communication session setup request message. The outbound communication session setup request message of step 3b therefore contains preceding device connectivity data for both Phone 1 and SBC 1.

The additional address associated with Phone 1 which is inserted into the SDP extension field of the first communication session setup request message is depicted as 'Ext: Phone 1' in steps 3b and 3c of FIG. 3. The media connectivity settings are also inserted into the extension field of the outbound communication session setup request message, although not depicted as such in FIG. 1 for the sake of brevity. The SIP Invite signaling message of step 3c is received at SBC 2 as an inbound communication session setup request message along an inbound signaling path to SBC 2

When SBC 2 receives the inbound communication session setup request message of step 3c, it compares the preceding device connectivity data with ensuing device connectivity data associated with the next device located in the signaling path for the communication session towards the terminating endpoint device, which in this case is Phone 2.

SBC 2 acts as a SIP back-to-back user agent for Phone 2, so has knowledge of the media connectivity settings for Phone 2 as well as knowledge of its own media connectivity settings. SBC 2 keeps a record of media connectivity settings for Phone 2 and itself, for example by storing media connectivity settings associated with Phone 2 and media connectivity settings associated with SBC 2 in database 110.

If the comparison between the preceding device connectivity data and ensuing device connectivity data identifies a match, then SBC 2 knows that at least one preceding device included in the signaling path for the communication session need not be included in the media path for the communication session. In this particular embodiment, SBC 2 knows, from the match between the media connectivity settings, that the media path for the communication session can bypass at least SBC 2.

In this case, the connectivity match occurs between the media connectivity settings associated with Phone 1 and Phone 2 respectively. This means that Phone 1 and Phone 2 are able to communicate media data directly between each other such that both SBC 1 and SBC 2 can be omitted from the media path for the communication session, i.e. the media path established for the communication session between Phone 1 and Phone 2 can bypass both SBC 1 and SBC 2.

SBC 2 therefore transmits an outbound second communication session setup request message comprising the address associated with Phone 1, which was received in the inbound communication session setup request message of step 3c, to Phone 2 in step 3d. The outbound communication session setup request message contains SDP for Phone 1, i.e. an address associated with Phone 1 is given as an offered address for transmittal of media data during the communication session. From this information, Phone 2 knows that it can communicate media data directly with Phone 1 during the communication session without the need for relaying of media data via SBC 2 or SBC 1.

Phone 2 accepts the communication offer received in step 3d by transmitting a first communication session setup response message to SBC 2 in the form of a SIP 200 OK signaling message in step 3e. The 200 OK message of step 3e contains SDP for Phone 2, i.e. an address associated with Phone 2 is given as an address for transmittal of media data during the communication session.

The first communication session setup response message indicates to SBC 2 that Phone 2 has agreed to conduct a communication session with Phone 1 with the media path for the communication session bypassing both SBC 2 and SBC 1.

SBC 2 creates a second communication session setup response message containing a bypass confirmation parameter confirming to devices located in the inbound signaling path, including SBC 1, that SBC 1 and SBC 2 have been bypassed in the media path established for the communication session. The second communication session setup response message contains SDP for Phone 2, i.e. an address associated with Phone 2 is given as an address for transmittal of media data during the communication session.

SBC 2 transmits the second communication session setup response message to SIP registrar 114 in the form of a SIP 200 OK message in step 3f. SIP registrar 114 forwards the response message of step 3f on to SBC 1 in the form of a SIP 200 OK message in step 3g. SIP registrar 114 does not alter the SDP information.

When SBC 1 receives the second communication session setup response message of step 3g, it knows from the bypass confirmation parameter contained within the second communication session setup response message that it has been bypassed in the media path established for the communication session. SBC 1 therefore knows that it will not receive any media data for transfer between Phone 1 and Phone 2 in the communication session and forwards the second communication session setup response message on to Phone 1 without changing the SDP data in step 3h.

Media data then flows directly between Phone 1 and Phone 2 without passing via SBC 1 or SBC 2, i.e. media data flowing from Phone 1 is passed directly from Phone 2 and media data flowing from Phone 2 is passed directly to Phone 1 as per item 300 in FIG. 3.

In these embodiments of the invention, the signaling path for the communication session includes Phone 1, SBC 1, SBC 2 and Phone 2. However, the media path for the communication session includes Phone 1, and Phone 2, but not SBC 1 or SBC 2.

Transfer of other signaling messages (not shown), such as SIP Ack messages may be transmitted between Phone 1, SBC 1, SIP registrar 114, SBC 2, and Phone 2 before media data begins to flow during the communication session.

Figure 4:
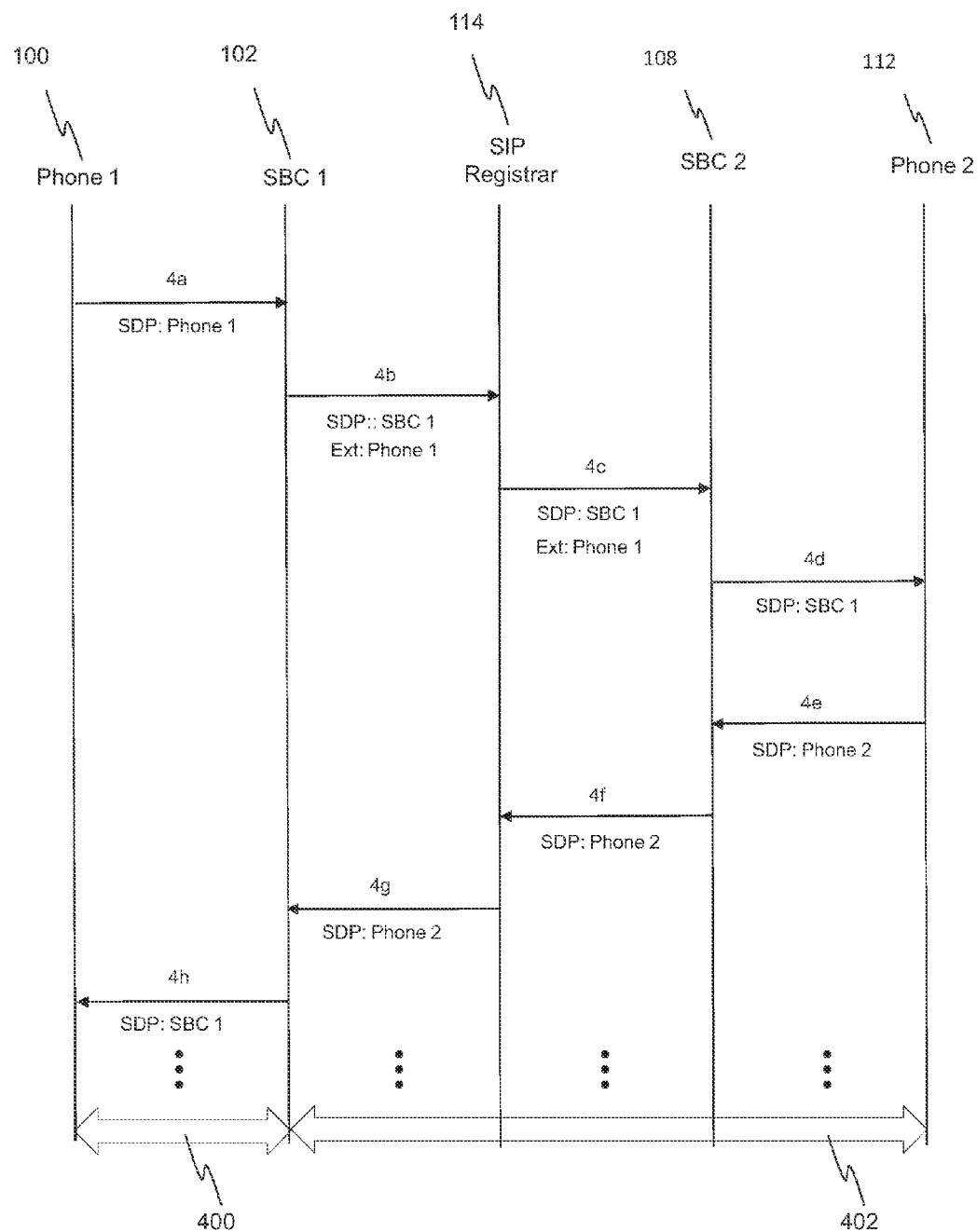
FIG. 4 is a message flow diagram depicting control of a communication session according to embodiments of the present invention.

FIG. 4 is a message flow diagram depicting control of a communication session according to embodiments of the present invention. The embodiments of FIG. 4 can be implemented in a system as depicted in FIG. 1. In these embodiments of the invention, the signaling path for the communication session includes Phone 1, SBC 1, SBC 2 and Phone 2. However, the media path for the communication session includes Phone 1, SBC 1 and Phone 2, but not SBC 2, i.e. the media path bypasses SBC 2.

These embodiments of the invention involve enabling bypass of a media gateway in a telecommunications network 1 which includes a plurality of media gateways SBC 1, SBC 2 via which a signaling path for transfer of signaling information for setup of a communication session between endpoint devices 100, 112 can be established and via which a media path for transfer of media data between the endpoint devices during the communication session can be established.

Steps 4a to 4c of FIG. 4 occur in similar manner to steps 3a to 3c as described above in relation to FIG. 3.

When SBC 2 receives the inbound communication session setup request message of step 4c, it compares the preceding device connectivity data with ensuing device connectivity data associated with the next device located in the signaling path for the communication session towards the terminating endpoint device, which in this case is Phone 2.

In these embodiments, a connectivity match occurs between the media connectivity settings associated with SBC 1 and Phone 2 respectively. This means that SBC 1 and Phone 2 are able to communicate media data directly between each other such that SBC 2 can be omitted from the media path for the communication session, i.e. the media path established for the communication session between Phone 1 and Phone 2 can bypass SBC 2.

SBC 2 therefore transmits an outbound communication session setup request message comprising the address associated with SBC 1, which was received in the inbound communication session setup request message of step 4c, to Phone 2 in step 4d. The outbound communication session setup request message contains SDP for SBC 1, i.e. an address associated with SBC 1 is given as an offered address for transmittal of media data during the communication session. From this information, Phone 2 knows that it can communicate media data directly with SBC 1 during the communication session without the need to relay media data via SBC 2.

Phone 2 accepts the communication offer received in step 4d by transmitting a first communication session setup response message to SBC 2 in the form of a SIP 200 OK signaling message in step 4e. The 200 OK message of step 4e contains SDP for Phone 2, i.e. an address associated with Phone 2 is given as an address for transmittal of media data during the communication session.

The first communication session setup response message indicates to SBC 2 that Phone 2 has agreed to conduct a communication session with Phone 1 with the media path for the communication session bypassing SBC 2.

SBC 2 creates a second communication session setup response message which contains a bypass confirmation parameter confirming to devices located in the signaling path towards the originating endpoint device, including SBC 1, that SBC 2 has been bypassed in the media path established for the communication session. The second communication session setup response message contains SDP for Phone 2, i.e. an address associated with Phone 2 is given as an address for transmittal of media data during the communication session.

SBC 2 transmits the second communication session setup response message to SIP registrar 114 in the form of a SIP 200 OK message in step 4f. SIP registrar 114 forwards the response message of step 4f on to SBC 1 in the form of a SIP 200 OK message in step 4g. SIP registrar 114 does not alter the SDP information.

When SBC 1 receives the second communication session setup response message of step 4g, it knows from the media bypass confirmation parameter contained within the second communication session setup response message that SBC 2 has been bypassed in the media path established for the communication session. SBC 1 therefore knows that it is included in the media path for the communication session between Phone 1 and Phone 2. SBC 1 alters the SDP data in the communication session setup response message of step 4g to refer to SBC 1, i.e. an address associated with SBC 1 is given as an address for transmittal of media data during the communication session. SBC 1 then forwards the communication session setup response message to Phone 1 in step 4h.

Media data then flows between Phone 1 and Phone 2 passing via SBC 1 but not SBC 2, i.e. media data flowing from Phone 1 is passed to SBC 1 as per item 400 in FIG. 4 and on to Phone 2 as per item 402 in FIG. 4. Similarly, media data flowing from Phone 2 is passed to SBC 1 as per item 402 in FIG. 4 and on to Phone 1 as per item 400 in FIG. 4.

In these embodiments of the invention, the signaling path for the communication session includes Phone 1, SBC 1, SBC 2 and Phone 2. However, the media path for the communication session includes Phone 1, and Phone 2 and SBC 1, but not SBC 2.

Transfer of other signaling messages (not shown), such as SIP Ack messages may be transmitted between Phone 1, SBC 1, SIP registrar 114, SBC 2, and Phone 2 before media data begins to flow during the communication session.

Figure 5:
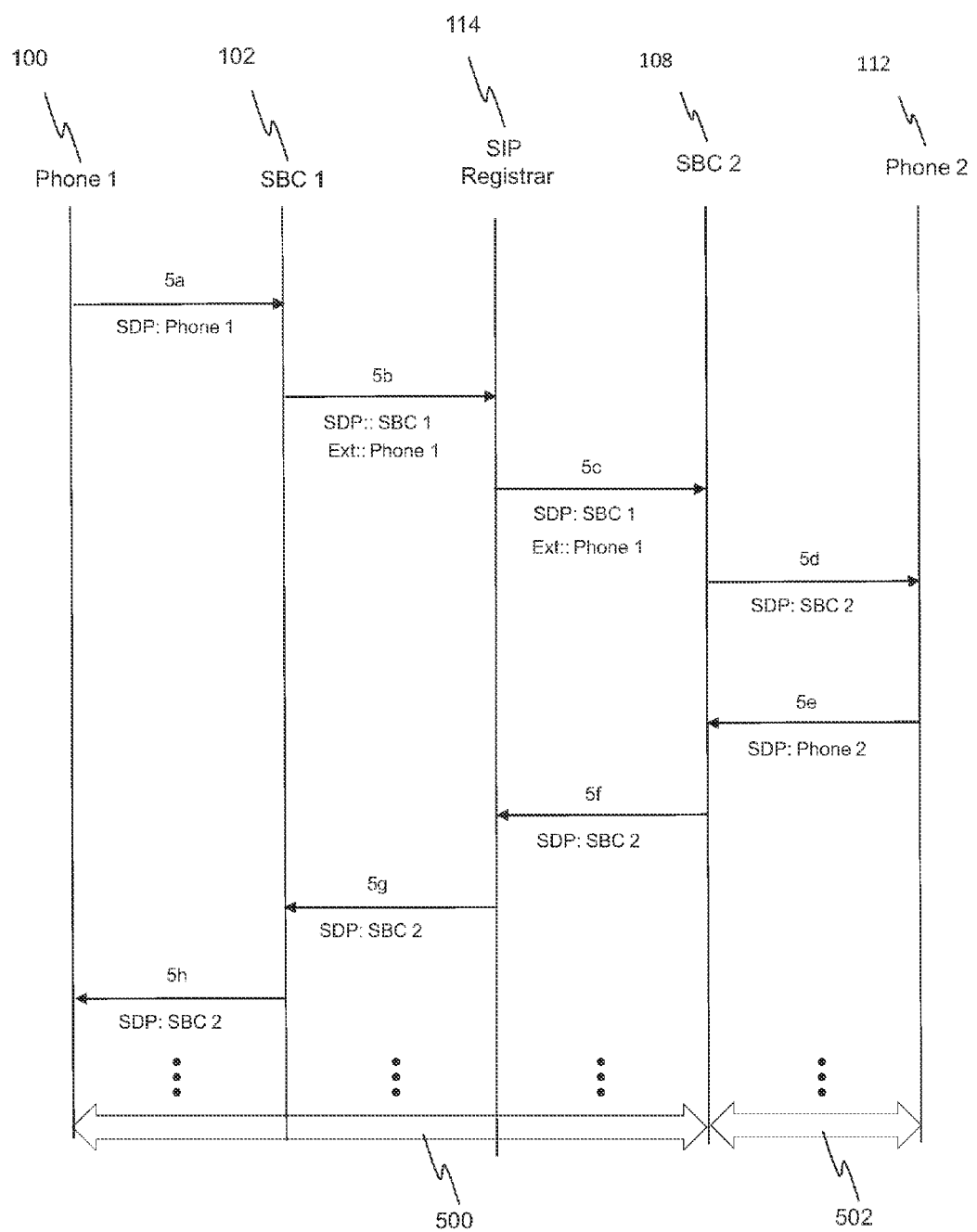
FIG. 5 is a message flow diagram depicting control of a communication session according to embodiments of the present invention.

FIG. 5 is a message flow diagram depicting control of a communication session according to embodiments of the present invention. The embodiments of FIG. 5 can be implemented in a system as depicted in FIG. 1. In these embodiments of the invention, the signaling path for the communication session includes Phone 1, SBC 1, SBC 2 and Phone 2. However, the media path for the communication session only includes Phone 1, SBC 2 and Phone 2, i.e. the media path bypasses SBC 1.

These embodiments of the invention involve enabling media bypass in a telecommunications network 1 which includes a plurality of media gateways SBC 1, SBC 2 via which a signaling path for transfer of signaling information for setup of a communication session between endpoint devices 100, 112 can be established and via which a media path for transfer of media data between the endpoint devices during the communication session can be established.

Steps 5a to 5c of FIG. 5 occur in similar manner to steps 3a to 3c as described above in relation to FIG. 3.

When SBC 2 receives the inbound communication session setup request message of step 5c, it carries out a first comparison stage comparing the preceding connectivity data with ensuing connectivity data associated with the next device located in the signaling path for the communication session towards the terminating endpoint device, which in this case is Phone 2. In these embodiments, no connectivity match between the preceding connectivity data and the ensuing connectivity data is identified in the first comparison stage.

SBC2 now carries out a second comparison stage to compare the preceding connectivity data with a connectivity data associated with SBC 2 itself. In these embodiments a match is found between the media connectivity settings associated with Phone 1 and SBC 2 respectively. This means that Phone 1 and SBC 2 are able to communicate media data directly between each other such that SBC 1 can be omitted from the media path for the communication session, i.e. the media path established for the communication session between Phone 1 and Phone 2 can bypass SBC 1.

SBC 2 therefore transmits an outbound communication session setup request message comprising the address associated with SBC 2, which was received in the first communication session setup request message, to Phone 2 in step 5d. The second communication session setup request message contains SDP data for SBC 2, i.e. an address associated with SBC 2 is given as an offered address for transmittal of media data during the communication session. From this information, Phone 2 knows that it should communicate media data to SBC 2 during the communication session.

Phone 2 accepts the communication offer received in step 5d by sending a first communication session setup response message to SBC 2 in the form of a SIP 200 OK signaling message in step 5e. The 200 OK message of step 5e contains SDP for Phone 2, i.e. an address associated with Phone 2 is given as an address for transmittal of media data during the communication session.

The first communication session setup response message indicates to SBC 2 that Phone 2 has agreed to conduct a communication session with Phone 1 with the media path for the communication session including SBC 2.

SBC 2 creates a second communication session setup response message containing a bypass confirmation parameter confirming to devices located in the inbound signaling path, including SBC 1, that SBC 1 has been bypassed in the media path established for the communication session. The second communication session setup response message contains SDP for SBC 2, i.e. an address associated with SBC 2 is given as an address for transmittal of media data during the communication session.

SBC 2 transmits the second communication session setup response message to SIP registrar 114 in the form of a SIP 200 OK message in step 5f. SIP registrar 114 forwards the response message of step 5f on to SBC 1 in the form of a SIP 200 OK message in step 5g. SIP registrar 114 does not alter the SDP information.

When SBC 1 receives the second communication session setup response message of step 5g, it knows from the media bypass confirmation parameter contained within the second communication session setup response message that it has been bypassed in the media path established for the communication session. SBC 1 therefore knows that it is not included in the media path for the communication session between Phone 1 and Phone 2. SBC 1 therefore de-allocates any media resources for the communication session and passes the SDP data in the communication session setup response message of step 5g on to Phone 1 unchanged in step 5h, i.e. an address associated with SBC 2 is given as an address for transmittal of media data during the communication session.

Media data then flows between Phone 1 and Phone 2 passing via SBC 2 but not SBC 1, i.e. media data flowing from Phone 1 is passed to SBC 2 as per item 500 in FIG. 5 and on to Phone 2 as per item 502 in FIG. 5. Similarly, media data flowing from Phone 2 is passed to SBC 2 as per item 502 in FIG. 5 and on to Phone 1 as per item 500 in FIG. 5.

In these embodiments of the invention, the signaling path for the communication session includes Phone 1, SBC 1, SBC 2 and Phone 2. However, the media path for the communication session includes Phone 1, SBC 2 and Phone 2, but not SBC 1.

Transfer of other signaling messages (not shown), such as SIP Ack messages may be transmitted between Phone 1, SBC 1, SIP registrar 114, SBC 2, and Phone 2 before media data begins to flow during the communication session.

The embodiments of the invention described above involve control of communication sessions having two media gateways involved in the signaling path for a communication session, i.e. SBC 1 and SBC 2. In these embodiments of the invention, SBC 1 will receive an inbound communication session setup request message containing address information for Phone 1 and also media connectivity settings for Phone 1. SBC 1 keeps a record of this data by storing it in a media bypass data stack in database 104. The media bypass data stack includes a number of entries each associated with a different device. Each entry is identified by a stack ID and includes a media address associated with the device to which media data can be transmitted and also media connectivity settings giving the media connectivity for that device.

A media bypass data stack could be implemented in the form of a series of contiguous headers inserted into an extension field of an SDP field of a SIP setup request message.

An exemplary header file could be as follows:
a=x-msmb: v=1;t=1;i=0;c=B:my_tag;o=IN IP4 10.1.2.1; m=IN IP4 10.11.12.15 4609\r\n"

Here, the 'a' parameter could identify the header file as a media bypass functionality header file, the 'v' parameter could relate to the version of the media bypass functionality, the 't' parameter could relate to the type of the header (such as setup request or setup response), the 'i' parameter could relate to the stack ID of a media bypass data stack entry, the 'c' parameter could relate to the extent of media bypass (such as full or partial media bypass where all or some media gateways are to be bypassed respectively), the 'o' parameter could relate to a bypass notification parameter, and the 'm' parameter could relate to a media address associated with a device which a current media gateway has identified as being last in the media path for the communication session.

When a media gateway adds its associated media address and media connectivity settings to the media bypass data stack, it will create an additional entry at the top of the media bypass data stack, allocating the entry the next available stack ID. When this occurs at multiple media gateways a series of entries are built onto the media bypass data stack in ascending order of stack ID, i.e. a media bypass data stack entry with a lower stack ID is nearer to the bottom of the stack than an entry with a higher stack ID with the bottom entry on the media bypass data stack having a stack ID of 0 and the topmost entry having the highest stack ID.

When a media gateway which supports the media bypass functionality of the invention receives an inbound communication session setup request message, it processes the data included in the media bypass data stack which is contained in the communication session setup request message, for example in an extension part of an SDP field of the message. The processing may involve adding, removing or otherwise updating entries within the media bypass data stack before forwarding an outbound communication session setup request message containing the updated media bypass data stack on to the next device in the signaling path for the communication session. Rules for how a device should process the contents of the media bypass data stack are described later below in relation to FIGS. 7 to 9.

FIG. 6 depicts several media bypass data stacks according to embodiments of the present invention.

An exemplary media bypass data stack involving a number of SBCs (SBC 1, SBC 2, SBC 3 and SBC 4) in the signaling path for a communication session is depicted in FIGS. 6A to 6D. Each SBC has an inbound and an outbound trunk, and connectivity is defined on each of these. A media bypass data stack is inserted into an extension field of a communication session setup request message for transmittal to the ensuing device in the signaling path for the session. Each SBC may keep a record of this data, for example by storing it in a media bypass data stack in database 104.

At SBC 1, the inbound trunk (connected to an endpoint device Phone 1) has connectivity A, B, C. SBC 1 therefore adds a stack element with the address of Phone1 (aPhone1) and connectivity A, B, C and transmits this in a communication session setup request message to SBC 2. An address for SBC 1 is given in the main SDP field. The data stack contents are depicted in FIG. 6A.

At SBC 2, SBC 1 connectivity (where the request was received from) is determined by looking at the connectivity configured on the inbound trunk of SBC 2 on which it received the message, in this case connectivity X. SBC 2 therefore adds a stack element with the address of SBC 1 (aSBC1) and connectivity X and transmits this in a communication session setup request message to SBC 2. An address for SBC 2 is given in the main SDP field. The data stack contents are depicted in FIG. 6B.

At SBC 3, SBC 2 connectivity (where the request was received from) is determined by looking at the connectivity configured on the inbound trunk of SBC 3 on which it received the message, in this case connectivity F, G, H. SBC 3 therefore adds a stack element with the address of SBC 2 (aSBC 2) and connectivity F, G, H and transmits this in a communication session setup request message to SBC 4. An address for SBC 3 is given in the main SDP field. The data stack contents are depicted in FIG. 6C.

SBC 4 thus receives a data stack containing three stack elements (added by SBCs 1, 2 and 3 respectively, which contain connectivity (A,B,C), (X), and (F,G,H) respectively. The inbound trunk on SBC4 has connectivity T,U,V. This connectivity would be added to an onward request. However, the connectivity on the outbound trunk of SBC4 is X, Y, Z and this outbound connectivity for SBC4 matches the connectivity of a stack element, i.e. connectivity X from the outbound trunk of SBC1. Because the inbound connectivity of SBC2 matches the outbound connectivity of SBC4, this means that SBC 2, SBC3 and SBC 4 can be bypassed and the media can flow from Phone 1 to SBC 1 and directly on to the ensuing device in the signaling path after SBC 4. SBC 4 enables this bypassing by removing all data stack elements including and above the matching element. The onward communication session setup request message from SBC4 therefore contains one stack element with stack ID=0 containing an address for Phone 1 (aPhone 1) and connectivity A, B, C. An address for SBC 1 is given in the main SDP field.

Embodiments of the invention involve inserting a bypass notification parameter into the outbound communication session setup request message from a media gateway. The bypass notification parameter allows a media gateway which does support the media bypass functionality of the present invention (referred to herein as an "enabled" media gateway) to determine whether the signaling path for a communication session has passed through a media gateway which does not support the media bypass processes of the present invention (referred to herein as a "vanilla" media gateway).

The bypass notification parameter is included in the second standard field of the outbound communication session setup request message. The bypass notification parameter is capable of notifying an enabled ensuing device located in the outbound signaling path (the enabled ensuing device is capable of processing preceding device connectivity data, for example stored in the second standard field of the communication session setup request message) that the preceding device connectivity data was not altered by another, non-enabled, ensuing device in the outbound signaling path, if such non-enabled ensuing device is located between the enabled ensuing device and the media gateway.

In embodiments of the invention, when processing inbound communication session setup signaling for a communication session, an enabled media gateway will update the bypass notification parameter by setting the bypass notification parameter for the topmost element in the media bypass data stack to be the same as the media address associated with the device which the given, enabled, media gateway has identified as being last in the media path for the communication session. The enabled ensuing media gateway will then transmit an appropriate outbound communication session setup request message on to the next ensuing device in the signaling path of the communication session including the updated bypass notification parameter associated with the topmost element of the media bypass data stack.

An enabled ensuing media gateway, upon receiving an inbound communication session setup request message for the communication session will process the media bypass data stack contained in the message in order to identify media bypass opportunities and then update the bypass notification parameter in an outbound communication session setup request message accordingly.

However, a vanilla ensuing media gateway, upon receiving an inbound communication session setup request message for the communication session will simply add a media address associated with itself for transmittal of media data, for example by inserting this address into the SDP data, as per standard behaviour for such a vanilla media gateway without updating the bypass notification parameter. The vanilla media gateway will then transmit an outbound communication session setup request message to the next media gateway in the signaling path for the communication session. A vanilla media gateway will not alter the contents of the media bypass data stack or carry out any check with respect to the bypass notification parameter.

When the next media gateway in the signaling path for the communication session (which in this case is an enabled media gateway) receives an inbound communication session setup request message, it checks the bypass notification parameter to determine whether the previous device it received the communication session setup request message from is a vanilla media gateway or an enabled media gateway.

If, during the check, the bypass notification parameter for the topmost element in the media bypass data stack is not the same as the media address associated with the device identified as being last in the media path for the communication session, then the next media gateway can conclude that the communication session setup request message was received from a vanilla media gateway. The current, enabled, media gateway also thus knows that the previous vanilla media gateway cannot be bypassed and must remain in the media path for the communication session. The current, enabled, media gateway therefore deletes entries from the media bypass data stack to ensure that the previous vanilla media gateway will be not be bypassed in the media path for the communication session.

However, if, during the check, the bypass notification parameter for the topmost element in the media bypass data stack is the same as the media address associated with the device identified as being last in the media path for the communication session, then the next media gateway can conclude that the inbound communication session setup request message was received from an enabled media gateway and can proceed to process the media bypass data stack and bypass notification parameter for an outbound communication session setup request message accordingly.

The present invention is therefore able to function in telecommunications networks containing a mixture of enabled and vanilla media gateways and can be applied to communication sessions having a mixture of enabled and vanilla media gateways in the signaling path.

Figure 7:
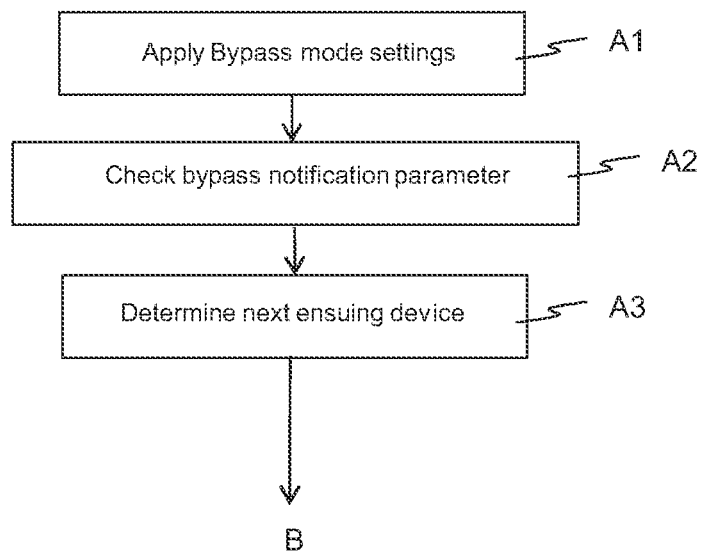
FIG. 7 is a flow chart depicting control of a communication session according to embodiments of the present invention.

FIG. 7 is a flow chart depicting control of a communication session setup request process according to embodiments of the present invention, i.e. steps carried out during the communication session offer process carried out in a direction from the originating endpoint device to the terminating endpoint device. In particular, FIG. 7 shows some initial steps in the communication session setup request process which a current media gateway carries out before considering the connectivity of the next ensuing device, i.e. the next device located in the signaling path for the communication session towards the terminating endpoint device.

In step A1, the current media gateway applies any bypass mode settings which require the media path bypassing of the invention not to be carried out for communication sessions passing via the current media gateway. If media path bypassing is not allowed for calls which pass through the current media gateway, the current media gateway deletes all entries from the data stack.

In step A2, the current media gateway checks that the bypass notification parameter for the topmost element in the data stack matches the media address associated with the device identified as being last in the media path for the communication session. This check is used to ensure that the last device in the media path may be bypassed. If the check fails, then entries in the data stack, including connectivity data, associated with previous devices is removed from the data stack.

In step A3, the next ensuing device in the signaling path for the communication session is determined and its media connectivity settings obtained, either retrieved from a locally accessible data store, or by requesting such from the next ensuing device itself.

Figure 8:
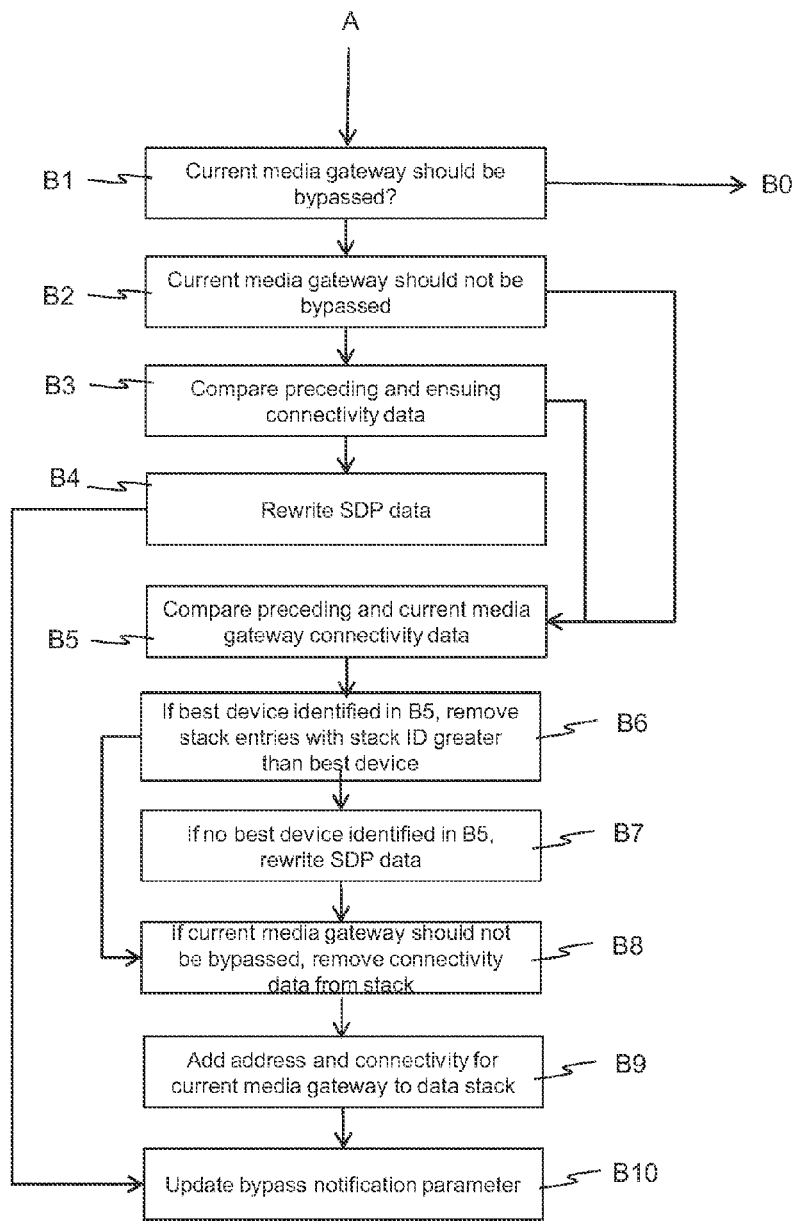
FIG. 8 is a flow chart depicting control of a communication session according to embodiments of the present invention.

Once the next ensuing device has been determined and its media connectivity settings are available, processing proceeds according to the flow chart of FIG. 8.

FIG. 8 is a flow chart depicting control of a communication session setup request process according to embodiments of the present invention.

In step B1, a check is made as to whether one or more bypass mode settings on the current media gateway require that the current media gateway should be bypassed. Bypass mode settings could be settings configured on a device by a service provider responsible for operating the device. If bypass mode settings indicate that the current media gateway should not participate in the media path and must be bypassed, then the SDP information in the communication session setup request signaling and contents of the media bypass data stack is forwarded on to the next ensuing device in the signaling path for the communication session unchanged. Processing for the current media gateway then ends, as per step B0.

In step B2, a check is made as to whether bypass mode settings indicate that the current media gateway should not be bypassed (even if connectivity settings of one or more other devices indicates that bypass of the current media gateway is otherwise possible). If the check indicates that the current media gateway should not be bypassed, then processing proceeds to step B5.

In step B3, the current media gateway compares the media connectivity settings of the next ensuing device in the signaling path for the communication session with those of previous device(s) in the signaling path in order to identify the 'best device' entry for media bypass purposes. This comparison is carried out with reference to the contents of the media bypass data stack and results in the device nearest the bottom of the data stack, i.e. furthest away in the inbound signaling path towards the originating endpoint device, which has connectivity to the next device in the outbound signaling path towards the terminating endpoint device being identified. Identifying the device nearest the bottom of the data stack which has connectivity to the next ensuing device, is preferable to identifying another device higher up in the data stack which has connectivity to the next ensuing device because this allows more devices in the media path to be bypassed.

If no connectivity settings match is found in the data stack, then processing passes to step B5.

In step B4, the SDP data in the communication session request setup message is rewritten with an address associated with the best device identified in step B3. Data associated with entries in the media bypass data stack having a stack ID greater than or equal to that of the identified best device is then removed from the media bypass data stack. This means that the device entry now at the top of the stack, if any, is the device with the next lowest stack ID after the identified best device. Processing then proceeds to step B10.

In step, B5, the current media gateway compares the media connectivity settings for itself with those of previous device(s) in the signaling path in order to identify the best device entry, if any, nearest the bottom of the media bypass data stack to which the current media gateway has connectivity.

Step B6 is carried out if a best device was identified in step B5, in which case, entries in the media bypass data stack containing data associated with devices with a stack ID greater than that of the best device identified in step B5 are then removed from the media bypass data stack. Note that unlike in step B4, in this case, the entry in the media bypass data stack data associated with the best device is left in the data stack and becomes the new topmost stack entry. Processing then proceeds to step B8.

Step B7 is carried out if no best device was identified in step B5, in which case the SDP data in the communication session request setup message is set as per the media address given in the SDP data received from the previous device in the signaling path.

If bypass mode settings allow this media gateway to be bypassed then an entry, including media connectivity settings, for this media gateway is added onto the top of the media bypass data stack.

Step B8 involves checking whether bypass mode settings indicate that the current media gateway should not be bypassed, in which case, data stack entries including connectivity data associated with previous devices are removed from the media bypass data stack.

In step B9, the current media gateway adds a media address associated with itself into the SDP data in preparation for transmittal to the next ensuing device.

Step B10 involves updating the bypass notification parameter. If a data stack containing media connectivity settings is being sent to the next ensuing device, the bypass notification parameter for the topmost entry in the media bypass data stack is updated to refer to the address identified as being last in the media path for the communication session. If a bypass notification parameter is present for any other entries in the media bypass data stack, then this is removed for all other entries.

Figure 9:
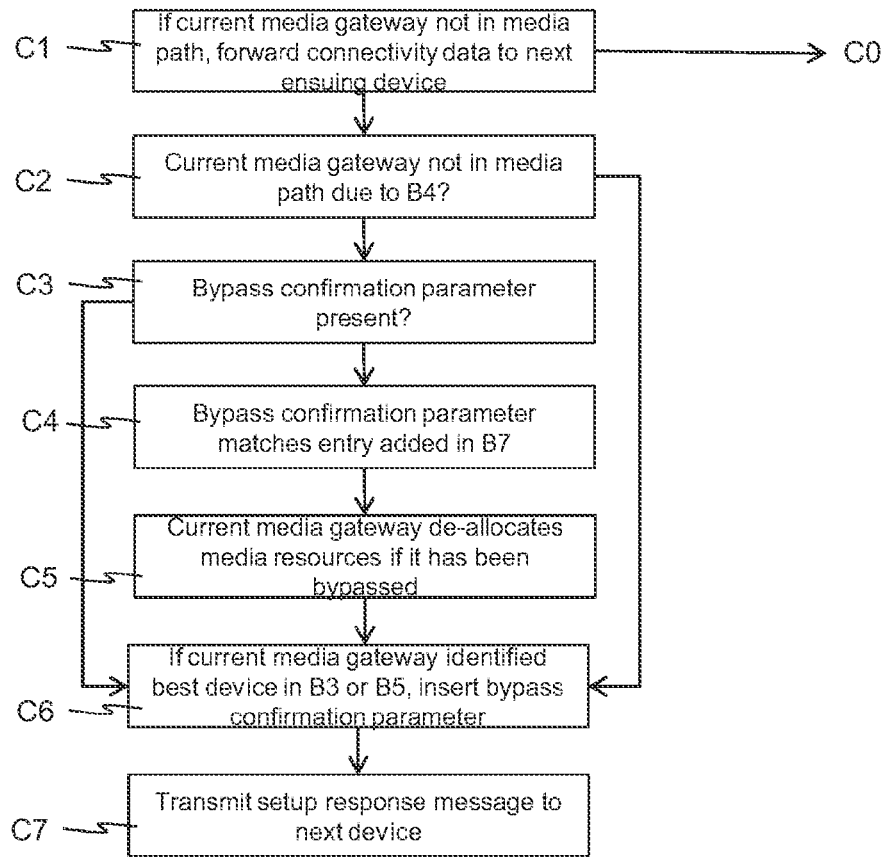
FIG. 9 is a flow chart depicting control of a communication session according to embodiments of the present invention.

FIG. 9 is a flow chart depicting control of a communication session setup response process according to embodiments of the present invention, i.e. steps carried out during the communication session response process carried out in a direction from the terminating endpoint device to the originating endpoint device.

In embodiments of the present invention, when a device is bypassed from the media path, additional data in the form of a bypass confirmation parameter is added into a communication session setup response message, for example appended to the SDP answer information in a communication session setup response message. The bypass confirmation parameter includes a stack ID for an entry in the media bypass data stack which is associated with the device upon which a media bypass has been agreed. The bypass confirmation parameter confirms to devices located in the signaling path towards the originating endpoint device from the current device that the identified device has been bypassed in the media path established for the communication session.

Step C1 is carried out if the current media gateway determined that it is not in the media path for the communication session in step B1 above, in which case, the SDP answer data and contents of the media bypass data stack contained in the communication session setup response message received by the current media gateway from the next ensuing device located in the signaling path for the communication session towards the terminating endpoint device are forwarded on to the next device located in the signaling path for the communication session towards the originating endpoint device unchanged. Processing for the current media gateway then ends, as per step C0.

In step C2, if the current media gateway determined that it is not in the media path as a result of step B3 above, then processing proceeds to step C6.

In step C3, if no bypass confirmation parameter was present in the communication session setup response message received by the current media gateway, then the SDP answer data forwarded on to the next preceding device located in the signaling path for the communication session towards the originating endpoint device is set based on the SDP answer received by the current media gateway. Processing then passes to step C6.

In step C4, if an entry was added onto the media bypass data stack in step B7 above and the stack ID in the bypass confirmation parameter matches the entry added in step B7, then the bypass confirmation parameter is deleted from the ongoing SDP answer information.

In step C5, the current media gateway knows that it has been bypassed in the media path established for the communication session, so it can de-allocate media plane resources accordingly.

In step C6, if no bypass confirmation parameter was present in the communication session setup response message received by the current media gateway and the current media gateway identified a best device in step B3 or B5 above, then a bypass confirmation parameter is inserted into a communication session setup response message, for example inserted into SDP answer data, transmitted on to the next device located in the signaling path for the communication session towards the originating endpoint device. The inserted bypass confirmation parameter contains a stack ID for the best device identified in step B3 or B5.

In step C7, a communications session setup response message containing any data inserted into the communication session setup response message according to steps C2 to C6 above is transmitted on to the next device located in the signaling path for the communication session towards the originating endpoint device.

The present invention is applicable to cases where there are a chain of more than two media gateways in the signaling path for a call. Each media gateway will process signaling information for the call, including processing of the media bypass data stack, according to the rules described above in relation to FIGS. 7 to 9.

In embodiments of the invention, a given media gateway may not identify a matching setting during comparison of media connectivity settings for a communication session. This means that the given media gateway has not identified any opportunities for bypassing one or more devices in the media path for the communication session. In such a case, the given media gateway will insert a media address associated with itself into communication session setup request signaling for the communication session such that media data can be transmitted via the given media gateway during the communication session. The given media gateway will also insert media connectivity settings for itself into the media bypass data stack contained in the communication session setup request signaling such that subsequent media gateways in the signaling path for the session might use the settings in order to identify other media bypass opportunities for the communication session.

The above embodiments are to be understood as illustrative examples of the invention. Further embodiments of the invention are envisaged.

Embodiments of the invention described above allow a media gateway to be removed from the media path for a communication session if other devices in the signaling path can communicate directly with each other. The present invention also allows a media gateway to be removed from the media path not because other devices in the signaling path can communicate directly with each other, but because a service provider requires at least one SBC to remain in the media path. This could for example occur if a media gateway is required to perform lawful intercept of media data in relation to a communication session, or because a media gateway is required to perform transcoding of media data for a communication session. In such cases, a service provider can configure such requirements as one or more bypass mode settings on a media gateway. Such bypass mode settings can act to override media bypass functionality of the invention such as described in relation to step B1 of FIG. 8 above.

The contiguous stack ID numbering scheme (from zero at the bottom to highest at the top) described in relation to embodiments of the invention above could be adjusted to different numbering schemes, for example counting down from the bottom of the stack to the top or allowing non-contiguous number of stack IDs. A media gateway can be configured such that if it receives a media bypass data stack during setup of a communication session which has a stack ID numbering scheme or stack structure which it does not recognize, then the media gateway can treat this as an error and abandon media bypass functionality for the communication session.

The present invention is described above in relation to a wireline telecommunication network. The present invention can also be applied to a wireless telecommunication network and/or a mixture of wireline and wireless telecommunications networks, the implementation of which will be clear to one skilled in the art in view of the foregoing disclosure.

The present invention is primarily described above in relation to processing of SIP signaling information, including processing of SIP setup request (or 'offer') messages and SIP setup response (or 'answer') messages. The present invention can also be applied to other signaling protocols, for example the H.323 recommendation from the ITU Telecommunication Standardization Sector (ITU-T). Implementing the present invention for H.323 may involve a different encoding of the media bypass data stack information because H.323 does not use SDP data. In SIP, an offer/answer model is used, whereas in H.323, both endpoints create offers for transmission of outgoing media data using Open Logical Channel (OLC) signaling. For H.323 signaling, the media bypass processing of the present invention could be carried out separately for the media channels in each direction by methods which will be clear to one skilled in the art.

Embodiments of the invention described above include mention of a media address associated with a device to which media data can be transmitted. A media address may have one or more associated ports at which media data can be received. Embodiments of the invention could therefore involve media data being transmitted to a media address/port pair of a device, or media data being transmitted to multiple media address/port pairs on a device. Further, a device may have more than one media address and the invention can be applied to such devices as will be clear to one skilled in the art.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of enabling media bypass for a media gateway in a telecommunications network which includes a plurality of media gateways via which a signaling path for transfer of signaling information for setup of a communication session between endpoint devices can be established and via which a media path for transfer of media data between said endpoint devices during said communication session can be established, said method comprising:
receiving, at said media gateway, an inbound communication session setup request message requesting setup of a communication session between an originating endpoint device and a terminating endpoint device in said telecommunications network, said inbound communication session setup request message being transmitted along an inbound signaling path to said media gateway;
transmitting, from said media gateway, an outbound communication session setup request message in response to receiving said inbound communication session setup message, said outbound communication session setup request message being transmitted along an outbound signaling path from said media gateway; and
including preceding device connectivity data in said outbound communication session setup request message, said preceding device connectivity data indicating at least one media connectivity setting for at least one preceding device which is located before said media gateway in said inbound signaling path, the at least one media connectivity setting identifying one or more other devices to which the preceding device is configured to be connectable in said media path, to enable bypass of said media gateway in said media path if an ensuing device in said outbound signaling path determines that such bypass should be conducted.

2. The method according to claim 1, wherein said preceding device connectivity data indicates at least one media connectivity setting for each of a plurality of preceding devices which are located before said media gateway in said inbound signaling path, the connectivity setting for each respective preceding device identifying one or more other devices to which said respective preceding device is configured to be connectable in said media path, to enable bypass of said media gateway and at least one other preceding device in said media path if an ensuing device in said outbound signaling path determines that such bypass should be conducted.

3. The method according to claim 1, wherein said inbound communication session setup request message comprises at least some of said connectivity data.

4. The method according to claim 1, further comprising:
retrieving ensuing device connectivity data for an ensuing device which is located after said media gateway in said outbound signaling path, said ensuing device connectivity data indicating at least one media connectivity setting for said ensuing device, the connectivity setting identifying one or more other devices to which said ensuing device is configured to be connectable in said media path; and comparing said preceding device connectivity data and said ensuing device connectivity data, and determining, from said comparison, whether said media gateway may be bypassed in said media path.

5. The method according to claim 4, wherein said ensuing device connectivity data is retrieved from storage in said media gateway.

6. The method according to claim 1, further comprising including in said outbound communication session setup request message an address associated with said media gateway as an offered address for transmittal of media data during said session, whereby the media path for said communication session can include said media gateway if it is not determined by an ensuing device that said media gateway should be bypassed in said media path.

7. The method according to claim 1, further comprising including in said outbound communication session setup request message an address associated with a different preceding device as an offered address for transmittal of media data during said session, wherein the media path for said communication session can bypass said media gateway, said different preceding device being located between said media gateway and said preceding device in said inbound signaling path.

8. The method according to claim 1, further comprising retrieving bypass mode data for said media gateway, said bypass mode data indicating a bypass mode setting for said media gateway, and configuring said outbound communication session setup request message in dependence on said indicated bypass mode setting.

9. The method according to claim 8, further comprising determining from said bypass mode data that said media gateway may be bypassed in said media path, and including said preceding device connectivity data in said outbound communication session setup request message in response to said determination.

10. The method according to claim 8, further comprising determining from said bypass mode data that said media gateway must be bypassed in said media path, including said preceding device connectivity data in said outbound communication session setup request message in response to said determination, and including in said outbound communication session setup request message an address associated with said preceding device as an offered address for transmittal of media data during said session, wherein the media path for said communication session can bypass said media gateway.

11. The method according to claim 1, further comprising including, in addition to said preceding device connectivity data, preceding device address data in said outbound communication session setup request message, said preceding device address data identifying a network address for transmittal of media data during said session.

12. The method according to claim 1, wherein said outbound communication session setup request message is configured according to a standard, wherein said standard includes:

a first standard field, which is specified in said standard, the contents of which are specified as including an address as an offered address for transmittal of media data during said session; and a second standard field, which is specified in said standard, the contents of which are specified for including extension data which are not specifically identified in said standard, wherein said preceding device connectivity data is inserted into said second standard field in said outbound communication session setup request message.

13. The method according to claim 12, further comprising inserting a bypass notification parameter into said outbound communication session setup request message, said bypass notification parameter being included in said second standard field and being capable of notifying an enabled ensuing device located in the outbound signaling path, which enabled ensuing device is capable of processing preceding device connectivity data in said second standard field, that said preceding device connectivity data was not altered by another, non-enabled, ensuing device in the outbound signaling path, if such non-enabled ensuing device is located between the enabled ensuing device and said media gateway.

14. The method according to claim 1, further comprising:

receiving, at said media gateway, a first communication session setup response message indicating that said terminating endpoint device has agreed to conduct said communication session with said originating endpoint device; and transmitting a second communication session setup response message to a device located in the inbound signaling path, said second communication session setup response message comprising a bypass confirmation parameter confirming, to devices located in the inbound signaling path, that said media gateway has been bypassed in the media path established for said communication session.

15. The method according to claim 1, wherein said at least one media connectivity settings comprise one or more of:

a domain identifier,
a network identifier, and
a gateway identifier.

16. The method according to claim 1, wherein said preceding device comprises said originating endpoint device.

17. The method according to claim 1, wherein said preceding device comprises a media gateway.

18. The method according to claim 1, wherein said ensuing device comprises a media gateway.

19. The method according to claim 1, wherein said inbound and outbound communication session setup request messages comprise Session Initiation Protocol, SIP, messages.

20. The method according to claim 1, wherein said preceding device connectivity data is included in a Session Description Protocol, SDP, field.

21. The method according to claim 20, wherein said preceding device connectivity data is included in a Session Description Protocol, SDP, extension field.

22. The method according to claim 1, wherein a given media gateway comprises a plurality of input and output communication trunks via which communication sessions can be conducted, each trunk being capable of having different associated media connectivity settings.

23. The method according to claim 1, wherein said media gateway comprises a session border controller.

24. The method according to claim 1, wherein said communication sessions comprise voice calls.

25. The method according to claim 1 further comprising not enabling bypass of said media gateway in said media path if an ensuing device in said outbound signaling path determines that such bypass should not be conducted.

26. A computer program product comprising a non-transitory computer-readable storage medium having computer readable instructions stored thereon, the computer readable instructions being executable by a computerized device to cause the computerized device to perform a method for enabling media bypass for a media gateway in a telecommunications network which includes a plurality of media gateways via which a signaling path for transfer of signaling information for setup of a communication session between endpoint devices can be established and via which a media path for transfer of media data between said endpoint devices during said communication session can be established, the method comprising:

receiving, at said media gateway, an inbound communication session setup request message requesting setup of a communication session between an originating endpoint device and a terminating endpoint device in said telecommunications network, said inbound communication session setup request message being transmitted along an inbound signaling path to said media gateway;

transmitting, from said media gateway, an outbound communication session setup request message in response to receiving said inbound communication session setup message, said outbound communication session setup request message being transmitted along an outbound signaling path from said media gateway; and including preceding device connectivity data in said outbound communication session setup request message, said preceding device connectivity data indicating at least one media connectivity setting for at least one preceding device which is located before said media gateway in said inbound signaling path, the at least one media connectivity setting identifying one or more other devices to which the preceding device is configured to be connectable in said media path, to enable bypass of said media gateway in said media path if an ensuing device in said outbound signaling path determines that such bypass should be conducted.

27. The computer program product according to claim 26 further comprising not enabling bypass of said media gateway in said media path if an ensuing device in said outbound signaling path determines that such bypass should not be conducted.

28. A method of enabling media bypass for a bypass-determining media gateway in a telecommunications network which includes a plurality of media gateways via which a signaling path for transfer of signaling information for setup of a communication session between endpoint devices can be established and via which a media path for transfer of media data between said endpoint devices during said communication session can be established, said method comprising:

receiving, at said bypass-determining media gateway, an inbound communication session setup request message requesting setup of a communication session between an originating endpoint device and a terminating endpoint device in said telecommunications network, said inbound communication session setup request message being transmitted along an inbound signaling path to said bypass-determining media gateway;

transmitting, from said bypass-determining media gateway, an outbound communication session setup request message in response to receiving said inbound communication session setup request message, said outbound communication session setup request message being transmitted along an outbound signaling path from said bypass-determining media gateway;

receiving preceding device connectivity data in said inbound communication session setup request message, said preceding device connectivity data indicating at least one media connectivity setting for at least one preceding device which is located before said bypass-determining media gateway in said inbound signaling path, the at least one media connectivity setting identifying one or more other devices to which the preceding device is configured to be connectable in said media path, to enable bypass of a preceding media gateway in said media path; and determining that said preceding media gateway should be bypassed based on said preceding device connectivity data, and configuring said outbound communication session setup request message in accordance with said determination.

29. The method according to claim 28 further comprising not enabling bypass of said media gateway in said media path based on said preceding device connectivity data.

30. A computer program product comprising a non-transitory computer-readable storage medium having computer readable instructions stored thereon, the computer readable instructions being executable by a computerized device to cause the computerized device to perform a method for enabling media bypass for a bypass-determining media gateway in a telecommunications network which includes a plurality of media gateways via which a signaling path for transfer of signaling information for setup of a communication session between endpoint devices can be established and via which a media path for transfer of media data between said endpoint devices during said communication session can be established, said method comprising:

receiving, at said bypass-determining media gateway, an inbound communication session setup request message requesting setup of a communication session between an originating endpoint device and a terminating endpoint device in said telecommunications network, said inbound communication session setup request message being transmitted along an inbound signaling path to said bypass-determining media gateway;

transmitting, from said bypass-determining media gateway, an outbound communication session setup request message in response to receiving said inbound communication session setup request message, said outbound communication session setup request message being transmitted along an outbound signaling path from said bypass-determining media gateway;

receiving preceding device connectivity data in said inbound communication session setup request message, said preceding device connectivity data indicating at least one media connectivity setting for at least one preceding device which is located before said bypass-determining media gateway in said inbound signaling path, the at least one media connectivity setting identifying one or more other devices to which the preceding device is configured to be connectable in said media path, to enable bypass of a preceding media gateway in said media path; and determining that said preceding media gateway should be bypassed based on said preceding device connectivity data, and configuring said outbound communication session setup request message in accordance with said determination.

31. The computer program product according to claim 30 further comprising not enabling bypass of said media gateway in said media path based on said preceding device connectivity data.

* * * * *

(12) INTER PARTES REVIEW CERTIFICATE (846th)
United States Patent
Lyons et al.

(10) Number: US 8,687,640 K1
(45) Certificate Issued: Feb. 21, 2018

(54) CONTROLLING COMMUNICATION SESSIONS

(75) Inventors: Michael Anthony Lyons; David Stephen Hammond; Nicholas Peter Larkin; Oliver James Carter

(73) Assignee: METASWITCH NETWORKS LTD

Trial Numbers:

IPR2015-01456 filed Jun. 22, 2015
IPR2015-01457 filed Jun. 22, 2015

Inter Partes Review Certificate for:

Patent No.: 8,687,640
Issued: Apr. 1, 2014
Appl. No.: 13/069,324
Filed: Mar. 22, 2011

The results of IPR2015-01456 and IPR2015-01457 are reflected in this inter partes review certificate under 35 U.S.C. 318(b).

INTER PARTES REVIEW CERTIFICATE
U.S. Patent 8,687,640 K1
Trial No. IPR2015-01456
Certificate Issued Feb. 21, 2018

AS A RESULT OF THE INTER PARTES REVIEW PROCEEDING, IT HAS BEEN DETERMINED THAT:

Claim 10 is found patentable.

Claims 1-9, 11, 12 and 15-31 are cancelled.

\* \* \* \* \*